May 30, 1961 R. W. BRAZDA 2,986,622
PORTABLE HEATER FOR TRUCKS AND THE LIKE
Filed Dec. 24, 1959 2 Sheets-Sheet 1

INVENTOR.
Roy W. Brazda
BY
John F. Brezina
Attorney

INVENTOR.
Roy W. Brazda
BY John F. Brezina
Attorney

United States Patent Office 2,986,622
Patented May 30, 1961

2,986,622
PORTABLE HEATER FOR TRUCKS AND THE LIKE
Roy W. Brazda, 3017 W. Cermak Road, Chicago, Ill.
Filed Dec. 24, 1959, Ser. No. 861,952
4 Claims. (Cl. 219—39)

My invention is directed to novel and special type of electrically powered heaters adapted for heating the interior of truck bodies, and especially milk delivery trucks.

In the transport and delivery of milk, dairy products and other foods, the problem exists of preventing the freezing and consequent spoilage of such food products while they are stored and transported in closed truck bodies to points of delivery and while the trucks are parked at loading platforms. This problem is accentuated by the importance of avoiding the introduction or delivery of heat of too high temperature and of avoiding the concentration of too high heat in any particular area of a truck body, which concentration of heat in specific areas would result in spoilage of the milk or other perishable food.

It is an important object of my invention to provide a portable heater of novel construction, and which may be releasably mounted to the ceiling or wall of the interior of a truck body and which will force and distribute the heated air substantially uniformly throughout the interior of the truck body and without producing so-called "hot spots" or excessively hot areas which would cause spoilage of the perishable food products within the truck body.

A further object of my invention is the provision of a heater of novel construction adapted to be mounted in or positioned in closed or closeable bodies of delivery trucks and which have means for connecting the same to an electric power source, and which include an electrical heating element mounted in an elongated tunnel, an electrical blower mounted to blow air through said tunnel; and an automatic thermostat together with suitable electrical connections and wires operatively connecting said blower, said heating element and said thermostat to a suitable electrical fitting which is releasably connectable to a receptacle of an electrical power circuit connected to an electric supply source.

A further object of my invention is the provision of heaters for truck bodies substantially as recited in the preceding paragraphs and which are easily and quickly assembled and installed and which are relatively inexpensive to manufacture; and which include a removably mounted cover member removably securable to the base of the heater to provide an elongated tunnel or passage through which the air is forced in heat exchange relation with a heating element mounted within said cover, to thereby force heated air under pressure to be distributed substantially uniformly throughout the interior of a closable truck body.

Other and further important objects of my invention will be apparent from the following description and appended claims.

On the drawings:

Fig. 1 is a top plan view of my novel electrically powered heater adapted for truck bodies or the like.

Figure 1:
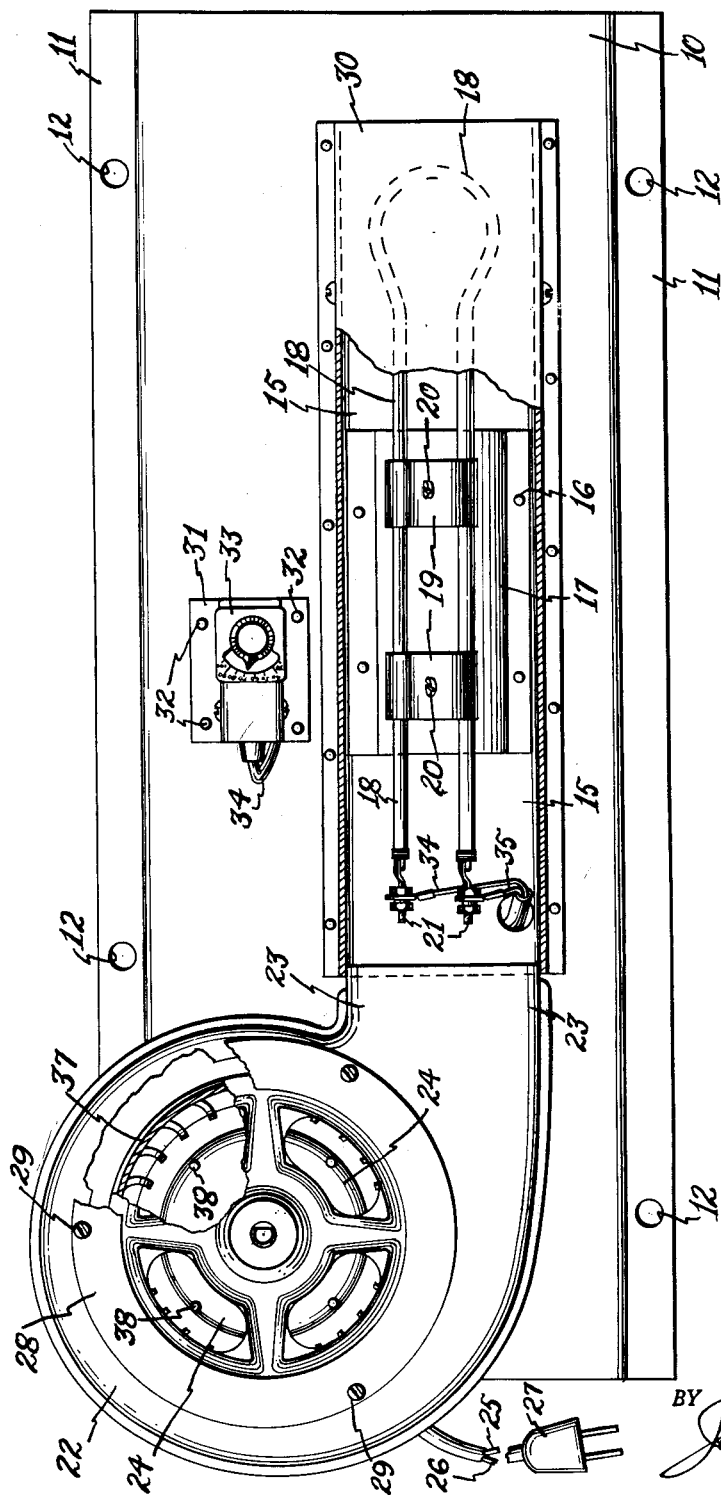

Referring to the drawings, numeral 10 designates an elongated metal base formed of rigid sheet metal which has angularly bent oppositely extending apertured flanges 11, and which is preferably of substantially rectangular form. Said flanges 11 have a plurality of spaced apart holes formed therein.

Figure 2:
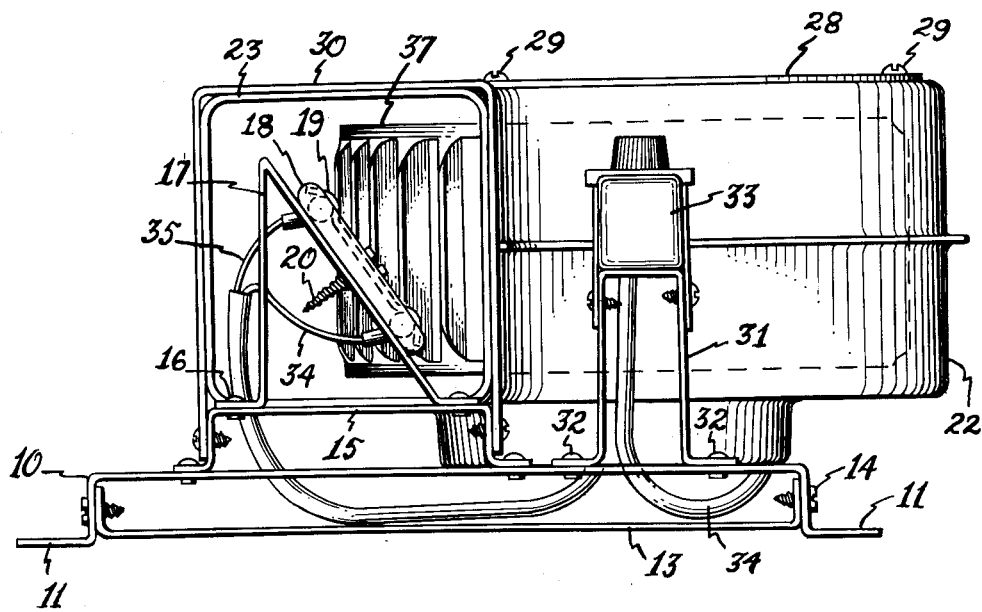
Fig. 2 is an elevational view looking at the right hand end portion of Fig. 1.

Numeral 13 designates an angularly bent metal connecting and guard plate whose opposite bent ends are secured to the flanged edge portions of base 10 by screws 14, as illustrated in Fig. 2. A U-shaped elongated channel-like mounting saddle 15 has its angularly bent edges secured by rivets to the base 10 so that said channel-like saddle 15 extends over the intermediate portion of the base 10 as illustrated in Fig. 1. Said saddle 15 extends to points a short distance inward of the ends as illustrated in Fig. 1.

Secured by rivets 16 to the intermediate portion of saddle 15 is an angularly bent metal bracket 17 whose apex extends normally upward. Said bracket 17 provides a means for mounting thereon of a U-shaped electrical heating element 18, whose spaced apart legs are removably secured on the inclined face of said bracket 17 by means of a pair of spaced apart metal clamps 19, which are secured by screws 20 to the bracket 17.

The U-shaped electrical heating element 18 has a pair of threaded terminals 21, as illustrated in Fig. 2, to which electrical wires are connected as hereinafter described.

Numeral 22 designates a rounded substantially metal housing which has an integral square shaped nozzle 23 as illustrated in Fig. 1. Said housing 22 has an electrical motor 24 mounted substantially centrally therein, said motor being suitably secured to the lower wall of said housing, and to the base 10 by bolts 30 which said bolts also secure the housing in position. Said motor 24 is electrically connectable to an electric power source by means of electric wires 25 and 26 and plug 27 partially illustrated in Fig. 1.

Securely mounted on the shaft of electric motor 24 is a squirrel cage type of fan 27 which has transversely extending blades, as illustrated in Fig. 1. The rotation of said fan 27 is adapted to pull air through the central side opening in housing 22 and to expel it under pressure through the nozzle 23. A metal ring 28 is secured by screws 29 to the inlet side of housing 22, as shown in Fig. 1, and removal of said ring 28 provides for mounting or removal of the fan 27 whenever such is required.

An elongated metal channel-like cover 30 of U-shaped cross section has its lower apertured edges releasably secured by screws to the two shoulders respectively of the saddle 15. Said cover 30 defines an elongated tunnel of rectangular cross section and covers and protects the heating element 18 and its terminal connections and the bracket 17 and adjacent parts. The discharge end of the nozzle 23 releasably extends into the entrance end of said tunnel and has a sliding fitting engagement therewith as illustrated in Fig. 1 so that all of the air propelled by said fan will pass through said tunnel in heat exchange relation with the heating coil or element 18.

Numeral 31 designates a metal U-shaped bracket whose apertured angularly bent legs are secured by rivets 32 to the base 10, as illustrated in Figs. 1 and 2. Secured by screws on said bracket 31 is a manually adjustable thermostatic switch 33 which has an adjustable upper control knob as illustrated.

Figure 3:
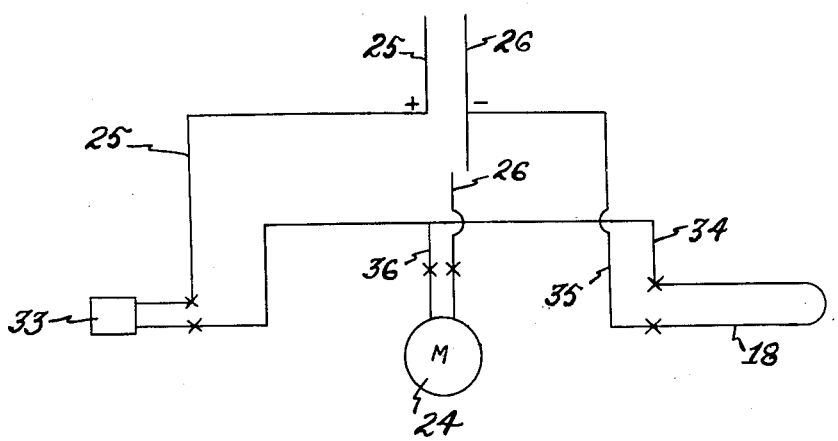
Fig. 3 is a diagrammatic view of the electrical circuit and wiring connections of the respective parts of my said heater.

Circuit wire 25, from the plug 27, is connected to one terminal of thermostat 33. As illustrated in Fig. 3, a circuit wire 34 connects the other terminal of thermostat 33 to one terminal of heating element 18. Circuit wire 35 connects the other terminal of the heating element 18 to circuit wire 26.

Circuit wire 26 connects the power plug 27 to one terminal of the electric motor 24. Another wire 36 connects wire 35 to the other terminal of electric motor 24.

Accordingly said motor 24 and said heating element 18 are connected in series, and the adjustable thermostat will selectively open and close the circuits to said heating element and to said motor according to the position of said thermostat switch to which it is manually set.

My heater is adapted to be positioned on the floor of a truck body in which perishable foods are transported. It may be optionally secured by screws (not shown) to the ceiling or wall of the truck body, in horizontal position, said screws being adapted to extend through holes 12 of base 10. The air heated by my device is discharged in a generally horizontal direction near the truck body floor and rises and is circulated substantially uniform throughout the truck body in which the foods are stacked in suitable containers, perforated boxes, trays or racks, for example, boxes of milk bottles.

Accordingly, concentration of heat on any particular portion of the foods is avoided, which if the same occurred, would otherwise cause spoilage, for example a souring of the milk.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A portable electrical heater for trucks and the like comprising a metal base; a pair of supporting brackets mounted on said base; an electrical heating element mounted on said brackets; a channel-like elongated cover open at its opposite ends, and secured over said heating element and over said brackets; an electrically driven blower; a housing in which said blower is mounted, said housing having a discharge opening communicating with one end portion of said channel-like cover; a thermostat connected to said base; and circuit wires connecting said electrical blower, said heating element and said thermostat and adapted to be connected to an electrical supply source.

2. A portable electrical heater substantially as recited in claim 1 and in which said circuit wires include a wire for connecting said thermostat to a power source; a wire connecting said thermostat and one terminal of said heating element; a wire connecting said thermostat and said blower; and wires connecting said blower and one terminal of said heating element to an electrical supply source.

3. In a portable heater for truck bodies and the like, an elongated metal base; brackets secured on said base; an electrical heating element secured to said brackets; a channel-like cover mounted over said heating element and secured to said base and forming an elongated tunnel surrounding said heating element; a metal housing; a fan rotatively mounted within said housing; an electric motor operatively connected to drive said fan; said housing having its discharge opening connected to one end of said tunnel; an electrical plug adapted to be connected to an electric power source; electric wires connecting said plug, said blower and said heating element; and a thermostat electrically connected to said plug and to said blower and said heating element whereby said thermostat will selectively open said circuits to said blower and heating element.

4. A portable electrical heater for truck bodies comprising an elongated metal base; an elongated metal saddle secured on said base longitudinally thereof; an angular bracket secured to said saddle; an electrical heating element mounted on said bracket, and having end terminals; a substantially round metal housing; an electric motor in said housing; a fan mounted on the shaft of said electric motor, said housing and said motor being secured to said base; a nozzle integral with the discharge opening of said housing; an elongated channel-like cover secured to said base and enclosing said heating element and providing an elongated tunnel, said nozzle and said housing being communicatively connected to the end portion of said cover; an electric circuit wire connecting said heating element and said motor and adapted to be connected to a power source; an adjustable thermostat interposed in said circuit wire; and a circuit wire connecting the other terminal of said heating element and said motor and adapted to be connected to a power source.

References Cited in the file of this patent

UNITED STATES PATENTS

| 1,288,506 | Carmean et al. | Dec. 24, 1918 |
| 2,257,342 | Lintern | Sept. 30, 1941 |
| 2,762,886 | Visos | Sept. 11, 1956 |

FOREIGN PATENTS

| 329,842 | Great Britain | May 29, 1930 |
| 483,039 | Great Britain | Apr. 6, 1938 |